(12) United States Patent
Satuluri et al.

(10) Patent No.: US 10,795,900 B1
(45) Date of Patent: Oct. 6, 2020

(54) REAL TIME ANALYSES USING COMMON FEATURES

(71) Applicant: Twitter, Inc., San Francisco, CA (US)

(72) Inventors: Venumadhav Satuluri, San Carlos, CA (US); Sebastian Schelter, Berlin (DE); Reza Bosagh Zadeh, Palo Alto, CA (US)

(73) Assignee: Twitter, Inc., San Francisco, CA (US)

( * ) Notice: Subject to any disclaimer, the term of this patent is extended or adjusted under 35 U.S.C. 154(b) by 664 days.

(21) Appl. No.: 14/938,719

(22) Filed: Nov. 11, 2015

(51) Int. Cl.
*G06F 16/248* (2019.01)
*G06F 16/9535* (2019.01)
*G06F 16/2457* (2019.01)

(52) U.S. Cl.
CPC ...... *G06F 16/248* (2019.01); *G06F 16/24575* (2019.01); *G06F 16/24578* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 2013/0097153 | A1* | 4/2013 | Barbieri | G06F 17/30817 707/722 |
| 2013/0326375 | A1* | 12/2013 | Barak | H04L 65/403 715/758 |
| 2015/0373149 | A1* | 12/2015 | Lyons | G05B 15/02 709/203 |
| 2016/0350309 | A1* | 12/2016 | Chatterjee | H04L 67/306 |

OTHER PUBLICATIONS

Smola, A., "Adventures in Data Land: Distributing Data in a Parameterserver," 2009-2016, 4 pages, [Online] [Retrieved on Mar. 9, 2016] Retrieved from the Internet<URL:http://blog.smola.org/post/86282060381/distributing-data-in-a-parameterserver>.

Koren, Y. et al., "Matrix Factorization Techniques for Recommender Systems," Computer, IEEE, 2009, pp. 42-49, [Online] [Retrieved on Mar. 9, 2016] Retrieved from the Internet<URL:https://datajobs.com/data-science-repo/Recommender-Systems-[Netflix].pdf>.

(Continued)

*Primary Examiner* — Alford W Kindred
*Assistant Examiner* — Soheila (Gina) Davanlou
(74) *Attorney, Agent, or Firm* — Fish & Richardson P.C.

(57) ABSTRACT

A messaging system provides recommendations of content that account holders of the messaging system might be interested in engaging with. In order to determine what to recommend, the messaging system generates a model of account holder engagement behavior organized by type of engagement. The model parameters are trained on differences between expected engagement behavior based on past data and actual engagement behavior, and include a set of common factor matrices that are trained using data from more than on engagement type. As a consequence, engagement behavior of other account holders with respect to other types of engagements different than the one sought to be recommended serves as a partial basis for determining what engagements of the sought-after type are recommended.

18 Claims, 7 Drawing Sheets

(56) References Cited

OTHER PUBLICATIONS

Zinkevich, M.A. et al., "Parallelized Stochastic Gradient Descent," pp. 1-36, [Online] [Retrieved on Mar. 9, 2016], Retrieved from the Internet<URL:http://www.research.rutgers.edu/~lihong/pub/Zinkevich11Parallelized.pdf>.

"Spark-1782: SVD for Sparse Matrix Using ARPACK #964," Apache/Spark, GitHub, Inc., 2016, 20 pages, [Online] [Retrieved on Mar. 9, 2016] Retrieved from the Internet<URL:https://github.com/apache/spark/pull/964.

"Machine Learning Library (MLlib)—Spark 0.9.0 Documentation," undated, [Online] [Retrieved on Mar. 9, 2016] Retrieved from the Internet<URL:https://spark.apache.org/docs/0.9.0/mllib-guide.html#collaborative-filtering-1>.

Li, M., "Talks: Parameter Server," Machine Learning Summer School 2014 in Pittsburgh, May be Viewed at <URL:http://parameterserver.org/talks.html>.

\* cited by examiner

Matrix M_F of follows
310 val1(i,j)

Follows (Columns)
302

|  | User a | User b | ... | ... | ... | ... | ... | User n |
|---|---|---|---|---|---|---|---|---|
| User a | 1 | 0 | 0 | 0 | 1 | 1 |  |  |
| User b |  | 1 |  |  |  |  |  |  |
| ... |  |  |  |  | 0 |  |  |  |
| ... |  |  |  | 1 |  |  |  |  |
| ... |  |  |  |  |  | 1 |  |  |
| User n | 1 | 0 |  |  |  |  |  | 1 |

Users (Rows) 304 val2(i,j)

FIG. 3A

Other example engagement matrices M 322 and their (rows, columns)

$M_F$ Follows (user, userid)
310

$M_T$ Favorites (user, message ids)
320

$M_R$ Reposts (user, repost ids)
330

$M_B$ Blocks (user, userid)
340

$M_U$ URL clicks(user, click ids)
350

Receive a request to provide a recommendation for an account i regarding accounts to follow F and messages to favorite T
710

↓

Access model parameters including common factor matrices trained on follow and favorite engagement matrix data
720

↓

Determine predicted values $p_F(i,j)$ and $p_T(i,j)$ for account i and a plurality of different engagements j in each of the follow and favorite engagement matrices using the model parameters
730

↓

Rank predicted values
740

↓

Select top N accounts to follow and messages to favorite
750

↓

Return selected accounts and messages in response to request
760

*FIG. 7*

REAL TIME ANALYSES USING COMMON FEATURES

BACKGROUND

The disclosure generally relates to messaging systems, and particularly to efficient computer processing of large volumes of data related to messages broadcast using an online system, where the data regarding the messages is obtained from many distinct client computing devices.

There are a wide range of messaging systems that allow account holders to exchange, broadcast, or multicast messages. These messaging systems also provide ways for account holders to view messages created by others, as well as respond to those messages. Generally, the messaging system provides each account holder with a personal platform for publishing and receiving messages. In some systems, this personalized platform categorizes messages into one or more streams of messages where the account holder chooses which messages appear in any given stream. Typically, there are a few different ways an account holder can include a message in one of their streams. Account holders can create a new message themselves, and they can copy (or repost) some or all of a message that has appeared in another account's stream. A messaging system may also allow this selection process to occur at the account level, such that an account holder can choose to receive in a stream all of the messages published by another account holder.

Using these mechanisms, these messaging systems allow an account holder to infinitely adjust their streams to include only those messages they want to receive. For those account holders, allowing such fine-tuning provides major advantages, as once a stream has been set up, from then on the messaging system will automatically populate the stream with whatever messages they have indicated they wish to receive.

However, existing messaging systems also provide automated functions for content surfacing. These systems analyze the use of the messaging system by its account holders to identify connections and commonalities in actions and interest by the account holders as a mechanism for identifying content that account holders may not have seen but yet may find interesting. More generally, these techniques are known as collaborative filtering. However, some modern messaging systems have many hundreds of millions of accounts creating millions of items of content on a daily basis, and generating, as a result of account holder activity, billions of interactions on a daily basis. Organizing and processing this data to provide meaningful information about the interconnection and commonality of interest between these disparate items of data can take exceptionally large amounts of processing power, and can be prohibitively expensive to run, particularly in real time as account holders use the messaging system.

SUMMARY

A messaging system includes a feature of providing recommendations of content that account holders of the messaging system might be interested in engaging with. To make a recommendation, the system predicts, for a given account holder, the likelihood that a given engagement such as an account holder A would "follow" account holder B, will occur for that user. The prediction is done by generating a model of the account holder's preferences and likely behavior by using the historical engagement data for the account holders stored by the messaging system. More specifically, the stored engagement data is stored by engagement type such as follows, clicks, etc. and may be indexed into matrices. The matrices reflect, by type of engagement, which content account holders have previously performed which engagements with which items of content. Based on this stored engagement data, the system predicts expected engagement behavior for a user. The system then receives the actual engagement data and uses the differences between the actual and the expected data to train model parameters.

A typical messaging system may include predicting one engagement type data at a time. For a set of engagement types, a prediction for each engagement type can be predicted in parallel. This method of prediction does not consider the common factors between the engagement types resulting in a lot of processing time to train the models. The disclosed embodiment of the messaging system includes training model parameters that include common factor matrices that are trained using data from more than one engagement type. By including these commonalities using a set of common factor matrices that are shared between two or more engagement types allow the total number of model parameters to be lower, allows more efficient training using less overall processing. Further, by reducing the total number of model parameters used, the entire set of model parameters can be stored in active memory, thus allowing for their real-time access and use in engagement predictions and content recommendations.

BRIEF DESCRIPTION OF DRAWINGS

Figure (FIG. 1 illustrates the computing environment of computing devices for determining the messages to include in a stream, according to one embodiment.

FIGS. 3A-3B illustrate exemplary engagement type matrix and its associated row and column vectors in a messaging system, according to one embodiment.

FIG. 7 is a flowchart of a method for recommending content of a plurality of engagement types for an account, according to one embodiment.

DETAILED DESCRIPTION

Figure 1:
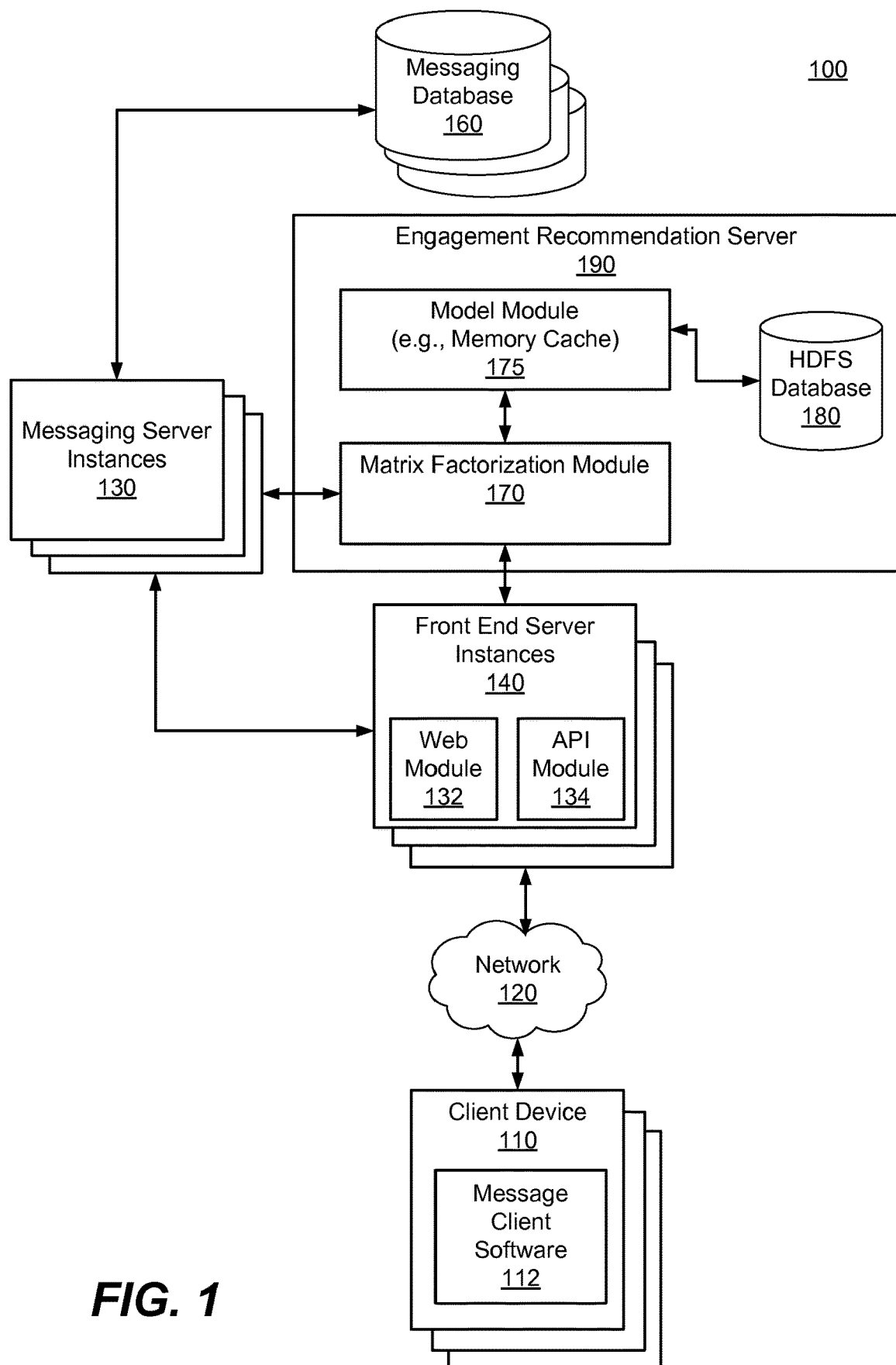

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

I. Configuration Overview

A messaging system includes a feature of providing recommendations of content that account holders of the messaging system might be interested in engaging with. In order to create the recommendations, the messaging system stores historical engagements by account holders with content made available by the messaging system, and uses this historical engagement information to generate a model of the account holder's preferences and likely behavior. More specifically, the stored engagement data is stored by engagement type, and may be indexed into matrices. The matrices reflect, by type of engagement, which content account holders have previously performed which engagements with which items of content. The system uses differences between expected engagement behavior based on the historical engagement data and actual engagement data to train model parameters which include a global bias by engagement type, bias vectors by engagement type, factor matrices by engagement type, and a set of common factor matrices that are trained using data from more than one engagement type. More specifically, the differences between historical and actual engagement data determine a common loss function that allows for iterative improvement on the values of the model parameters. By streaming prior engagement data (including both known engagement data and synthetic engagement data) into the system, the common loss function can be iteratively determined for each item of data, and the model parameters can be iteratively improved upon using the common loss function.

Although the model parameters are improved over time, at any time the system can access the model parameters to make content recommendations. To make a recommendation, the system predicts, for a given account holder, the likelihood that a given engagement will occur for that user using the model parameters. This prediction is made for many if not all the stored engagements in the database, and may be performed for one or more engagement types, depending upon the type of content that is requested for recommendations. These predictions may be compared against each other to identify engagements that are predicted to be most likely to occur. A subset of the engagements are selected, correlated with content stored by the messaging system, and returned as recommendations of content, an assumption being that if the user is determined to be likely to engage with the content, then they will most likely respond positively to it if presented the content. The recommended content may then, for example, be provided to the account holder for consumption, for example to their computing device (e.g., mobile phone) as part of a message stream that is visually displayed on a screen of the computing device.

Regarding the common factor matrices specifically, the common factor matrices are model parameters which represent commonalities in account holder engagements across engagement types. Quantifying these commonalities using a set of common factor matrices that are shared between two or more engagement types allow the total number of model parameters to be lower, as a single set of shared parameters is smaller than multiple sets of possibly redundant parameters specific to each engagement type. Additionally, training the set of common factor matrices is more efficient than training separate factor matrices of different engagement types, as more than one type of engagement data contributes to the training of the common factor matrices. This allows the model to be updated more quickly, and using less overall processing. Further, by reducing the total number of model parameters used, the entire set of model parameters can be stored in active memory, thus allowing for their real-time access and use in engagement predictions and content recommendations. Although a single engagement prediction and content recommendation may not require much processing power, performing a significant number of engagement predictions in order to recommend content is a time, processor, and memory intensive exercise, and as such it is beneficial to remove persistent storage device disk accesses entirely to help reduce the amount of processing required for each iteration/request.

II. Computing Environment

FIG. 1 illustrates the computing environment of computing devices for determining the messages to include in a stream, according to one embodiment. The environment includes one or more client devices 110 (generally, client device or client 110), a network 120, a front end server 140, a number of messaging server instances 130, a messaging database 160, an engagement recommendation server 190, a model module 175, a matrix factorization module 170, and a local database 180. It is noted that the front end server 140 may comprise one or more server computing machines.

Account holders use client devices 110 to access the messaging system in order to publish messages and view and curate their streams. A client device 110 is a computer including a processor, a memory, a display, an input device, and a wired and/or wireless network device for communicating with the front end server 140 of the messaging system over network 120. For example, a client device 110 may be a desktop computer, a laptop computer, a tablet computer, a smart phone, or any other device including computing functionality and data communication capabilities.

The processor of the client device 110 operates computer software 112 configured to access the front end server 140 of the messaging system so that the account holder can publish messages and view and curate their streams. The software 112 may be a web browser, such as GOOGLE CHROME, MOZILLA FIREFOX, or MICROSOFT INTERNET EXPLORER. The software 112 may also be a dedicated piece of software designed to work specifically with the messaging system. Generally, software 112 may also be a Short Messaging Service (SMS) interface, an instant messaging interface, an email-based interface, an API function-based interface, etc.

The network 120 may comprise any combination of local area and/or wide area networks, the internet, or one or more intranets, using both wired or wireless communication systems.

The messaging system generally provides account holders with the ability to publish their own messages and view messages authored by other accounts. Messages may take of variety of forms including, digital text, videos, photos, web links, status updates, blog entries, tweets, profiles, and the like. The messaging system may also provide various complementary services such as those provided by social networks, blogs, news media, forums, user groups, etc. Examples of messaging systems include FACEBOOK and TWITTER. The messaging system is a distributed network including multiple computing devices, where each computing device in the system includes computer hardware specifically chosen to assist in the carrying out of its specific purpose.

The client device 110 interface with the messaging system through a number of different but functionally equivalent front end servers 140. The front end server 140 is a computer server dedicated to managing network connections with remote client devices 110. As the messaging system may have many millions of accounts, there may be anywhere from hundreds of thousands to millions of connections being established or currently in use between client devices 110 and the front end server 140 at any given moment in time. Including multiple front end servers 140 helps balance this load across multiple countries and continents.

The front end server 140 may provide a variety of interfaces for interacting with a number of different types of client devices 110. For example, when an account holder uses a web browser 112 to access the messaging system, a web interface module 132 in the front end server 140 can be used to provide the client 110 access. Similarly, when an account holder uses an API-type software 112 to access the messaging system, an API interface module 134 can be used to provide the client 110 access.

The front end server 140 is further configured to communicate with the other backend computing devices of the messaging system. These backend computing devices carry out the bulk of the computational processing performed by the messaging system as a whole. The backend computing devices carry out any functions requested by a client device 110 and return the appropriate response (s) to the front end servers 140 for response to the client device 110.

The backend computing devices of the messaging system include a number of different but functionally equivalent messaging servers 130. The messaging servers 130 and their associated databases 160 are described immediately below with respect to FIG. 2. The engagement recommendation server 190 and its associated modules are described below in section IV.

III. Messaging Server

Figure 2:
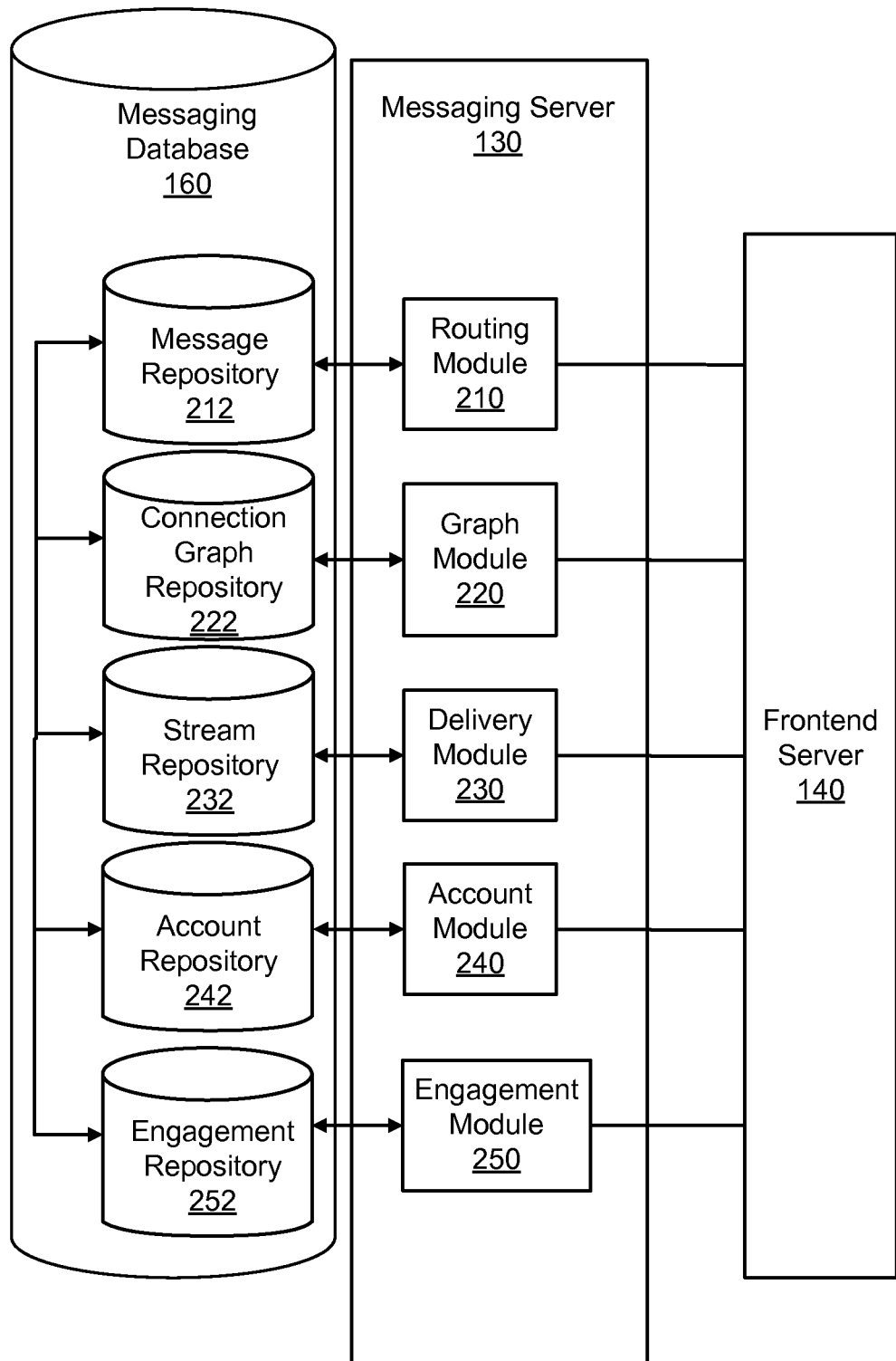
FIG. 2 illustrates the logical components of a messaging server, according to one embodiment.

FIG. 2 illustrates the logical components of a messaging server 130, according to one embodiment. Each messaging server 130 handles at least the basic messaging functionality of the messaging system. This basic functionality includes at least publishing new messages, providing message streams to be provided upon a request from a client device 110, managing accounts, managing connections between accounts, messages, and streams, and receiving engagement data from clients engaging with messages.

Each messaging server 130 includes a routing module 210, a graph fan-out module 220, a delivery module 230, and an account module 240. Each messaging server 130 is communicatively coupled with an associated database 160 which stores data locally for convenient access by the associated messaging server 130. Each database 160 includes a message repository 212, a connection graph repository 222, a stream repository 232, an account repository 242, and an engagement repository 252.

In the messaging system, messages are containers for a variety of types of computer data representing content provided by the composer of the message. Types of data that may be stored in a message include text (e.g., 140 character Tweet), graphics, video, computer code (e.g., uniform resource locators (URLs)), or other content. Messages can also include key phrases (e.g., symbols, such as hashtag "#") that can aid in categorizing or contextualizing messages. Messages may also include additional metadata that may or may not be editable by the composing account holder, depending upon the implementation. Examples of message metadata include the time and date of authorship as well as the geographical location where the message was composed (e.g., the current physical location of the client device 110). Message are not only a representation of the written text, video, or audio media, but also a representation of that content captured within an electronic representation, and stored as data within a computing device.

The messages composed by one account holder may also reference other accounts. For example, a message may be composed in reply to another message composed by another account. Messages may also be repeats (or reposts) of a message composed by another account. Generally, an account referenced in a message may both appear as visible content in the message (e.g., the name of the account), and may also appear as metadata in the message. As a result, the messaging system is able to allow the referenced accounts to be interactive. For example, clients 110 may interact with account names that appear in their message stream to navigate to the message streams of those accounts. The messaging system also allows messages to be private, such that a composed message will only appear in the message streams of the composing and recipient accounts.

The routing module 210 stores newly composed messages received through the front end server 140 in the message repository 212. In addition to storing the content of a message, the routing module 210 also stores an identifier for each message. The identifier provides a piece of information that can be used to identify that the message is to be included in a message stream. This allows the message to be stored only once, and accessed for a variety of different message streams without needing to store more than one copy of the message.

The graph module 220 manages connections between accounts, thereby determining which streams includes messages from which accounts. In one embodiment, the messaging system uses unidirectional connections between accounts (or streams) to allow account holders to subscribe to the message streams of other accounts. By using unidirectional connections, the messaging system allows an account holder to receive messages that appear in one of the streams of one of the other users, without necessarily implying any sort of reciprocal relationship the other way. For example, the messaging system allows account holder A to subscribe to the message stream of account holder B, and consequently account holder A is provided and can view the messages authored by account holder B. However, this unidirectional connection of A subscribing to B does not imply that account holder B can view the messages authored by account holder A. This could be the case if account holder B subscribed to the message stream of account holder A; however, this would require the establishment of another unidirectional connection. In one embodiment, an account holder who establishes a unidirectional connection to receive another account's message stream is referred to as a "follower", and the act of creating the unidirectional connection is referred to as "following" another account. The graph module 220 receives requests to create and delete unidirectional connections between accounts through the front end server 140. These connections are stored for later use in the connection graph repository 222 as part of a unidirectional connection graph. Each connection in the connection graph repository 222 references an account in the account repository 242 or a stream in the stream repository 232.

In the same or a different embodiment, the graph module 220 manages connections between account using bidirectional connections. Upon establishing a bidirectional connection, both accounts are considered subscribed to each other's account message stream(s). The graph module stores bidirectional connections in the connection graph repository 222. In one embodiment, the messaging system and connection graph repository 222 include both unidirectional and bidirectional connections. Additionally, the connections (both unidirectional and bidirectional) are electronic representations of relationships between physical entities.

The delivery module 230 constructs message streams and provides them to requesting clients 110 through the front end server 140. Responsive to a request for a stream, the delivery module 230 either constructs the stream in real time, or accesses some or all of a stream that has already been generated from the stream repository 232. The delivery module 230 stores generated streams in the stream repository 232. An account holder may request any of their own streams, or the streams of any other account that they are permitted to access based on security settings.

The messages included in a stream may have been authored by a connected account while both accounts are simultaneously accessing the messaging system. The messages included in a stream also include messages authored in the past by accounts that are not currently accessing the messaging system. As introduced above, the contents of a message stream for a requesting account holder may include messages composed by that account holder, messages composed by the other accounts that the requested account holder follows, and messages authored by other accounts that reference the requested account holder. The messages of a stream may be ordered chronologically by time and date of authorship, or reverse chronologically. Other orderings may also be used, such as according to their inferred relevance to the user, or some combination of time and relevance rankings.

A stream has the potential to include a large number of messages. For both processing efficiency and the requesting account holder's viewing convenience, the delivery module 230 generally identifies a subset of possible messages for sending to the client device 110 once the stream is generated. The remainder of the messages in the stream are maintained in the stream repository 232, and sent upon client device 110 request.

The account module 240 provides functionality allowing an account holder to manage their account with the messaging system, and is one means for doing so. The account module 240 allows the account holder to manage privacy and security settings, as well as directly manage their connections to other users. Generally, the messaging system does not require the account holder to contribute a large amount of personal information. This personal information can include an account name (not necessarily a real name) or identifier (ID), provides pictures of media, provide a brief description of themselves/their entity, and a website. The personal information does not necessarily include traditional real-world identifying information such as age, gender, interests, history, occupation, etc. Provided information is stored in the account repository 242.

The message client software 112 allows account holders receiving a stream to engage (e.g., interact) with the messages in the stream. The engagement module 250 receives these engagements and stores them in the engagement repository 252. There are a number of different types and categories of engagements. Types of engagements include clicking/selecting a message for more information regarding the message, clicking/selecting a URL (universal resource locator—URL clicks) or hashtag in a message, reposting the message (re-tweets), or favoriting a message so as to indicate affinity for the message (faves), blocking a user from following another user (blocks) or following messages (follows) from another user of the messaging system. Other example engagements types include expanding a "card" (or compressed) message, which presents additional (uncompressed) content when an account holder engages with the card message. Account holders may engage further with content contained in the expanded card message (e.g., by playing a video or audio file or by voting in a poll). Some engagements are based on passive behavior by the account holder with respect to a stream or message appearing on the client device 110.

In addition to monitoring active interactions (e.g., engagements) with messages through explicitly received input at the client device 110 from the account holder, the engagement module 250 may also record passive interactions (e.g., impressions) with messages by accounts. An impression occurs when an account holder views or otherwise experiences the content of a message through a client device 110. Impression engagements include the mere fact that an impression occurred, as well as other information such as whether a message in a stream appeared on a display of the client device 110, and how long the account holder dwelled on a message appearing on the display.

Any engagement stored in the engagement repository 252 may reference the messages, accounts, and/or stream involved in the engagement, for example via pointers to the message 212, account 242 and/or stream 232 repositories.

Engagements may also be categorized beyond their type. Example categories include engagements expressing a positive sentiment about a message (positive engagements), engagements expressing a negative sentiment about a message (negative engagements), engagements that allow an advertiser account to receive monetary compensation (monetizable engagements), engagements that are expected to result in additional future engagements (performance engagements), or connection engagements that are likely to result in one account holder following another account, etc. For example, the negative engagements category includes engagements such as dismissing a message or reporting a message as offensive while the positive engagements category typically includes engagements not in the negative engagements category. Example performance engagements include selecting a URL in a message or expanding a card. Example monetizable engagements include an engagement that results in an eventual purchase or a software application install to the client device 110. Generally, categories and types are not coextensive, and a given type of engagement may fall into more than one category, and vice versa.

IV. Engagement Recommendation Server

Using the messaging server 130 as described above, account holders can form connections with accounts, create streams of messages and engage with those messages. In addition to populating the message streams, the messaging system can provide content to the account holder that the account holder will perceive as useful. To do this, the messaging system uses the engagement data from other account holders to identify what might likely be interesting and useful to the account holder. The overwhelming amount of engagement data to be correlated for providing the recommendations is a challenge.

To overcome this challenge an engagement recommendation server 190 including a matrix factorization module 170 is used to provide an real-time service that can be accessed to in order to obtain content recommendations for account holders. The matrix factorization module 170 interfaces with a local database 180 (e.g., a magnetic storage device such as a hard drive or another type of high density file system (HDFS)) that stores the engagement data associated with the account holders and also interfaces with a model module 175 stored in active memory (e.g., RAM) that stores a portion of a computer model that is accessed by the matrix factorization module 170 to recommend content. The generated recommendations are communicated by the engagement recommendation server 190 to the front end server 140 to send to the client 110.

To provide the recommendations, the matrix factorization module 170 correlates the engagement data from database 180 by generating and updating a model in a batch process that runs periodically (e.g., daily, weekly) over a period of hours on one or more computers. This batch process to generate the model is generally asynchronous from any actual requests for content recommendation. As part of the batch process, the matrix factorization module 170 retrieves engagement data for account holders from the messaging databases 160 to generate/update engagement matrices with row vectors and column vectors that establish a relation of an account holder with an engagement type. The engagement matrices are further described with reference to FIGS. 3A and 3B. The engagement matrices are used to generate the computer models that are in turn used to make recommendations of content for an account holder.

The computer models are stored in active memory (e.g., RAM), such that the model's contents are made available for request in real-time by server 190 whenever a request is received from another computer, such one of the messaging server instances. Storing the model in active memory avoid the need, by server 190, to perform a disk access to a magnetic memory device each time a request is received that implicates the model. Storage in this manner is preferable, because performing a disk access would take a significantly greater amount of time per request, and based on the expected volume of requests for to server 190, performing a disk access for each request would be prohibitively costly from a time perspective (e.g., for random access, the difference in time is a matter of nanoseconds (for active memory) vs. milliseconds (for disk access). Storage of the model generally also avoids the need to recalculate the computer models from scratch for each request, which would be highly inefficient. As a specific example, the model may be stored using memcached (mem-cache-D).

FIG. 3A and FIG. 3B illustrates an exemplary engagement matrix and its associated row and column vectors in a messaging system, according to one embodiment. The figure shows an example of a follows matrix $M_F$ 310 that has vectors including rows indicating users (user$_a$-user$_n$) of the messaging system 304 and columns indicating the users being followed (user$_a$-user$_n$) 302. Each element of the matrix is represented by (i,j) indicating a user i following a user j. The value of each element represented by val1(i,j) and val2(i,j) indicates a relationship of the row vector to the column vector, in this case, a value of 1 in the element indicates user i follows user j and a value of 0 indicates user i does not follow user j. Empty values e.g. val2(i,j) indicate that the relationship of the user i to user j is not known.

There are other examples of engagement matrices 322 shown in the figure along with their respective row and column vectors 323. A favorites matrix 320 $M_T$ has row vectors indicating users of the messaging system that have favorited messages indicated by the message identifiers in the column vectors. The reposts matrix 330 $M_R$ has row vectors indicating users of the messaging system that have re-posted messages indicated by the repost identifiers in the column vectors. The blocks matrix 340 $M_B$ has row vectors indicating users of the messaging system that have blocked another user (blocked user identifier) indicated by the user identifiers in the column vectors. The URL clicks matrix 350 $M_U$ has row vectors indicating users of the messaging system that clicked posted URLs in the messaging system indicated by the click identifiers in the column vectors.

V. Matrix Factorization Module

Figure 4:
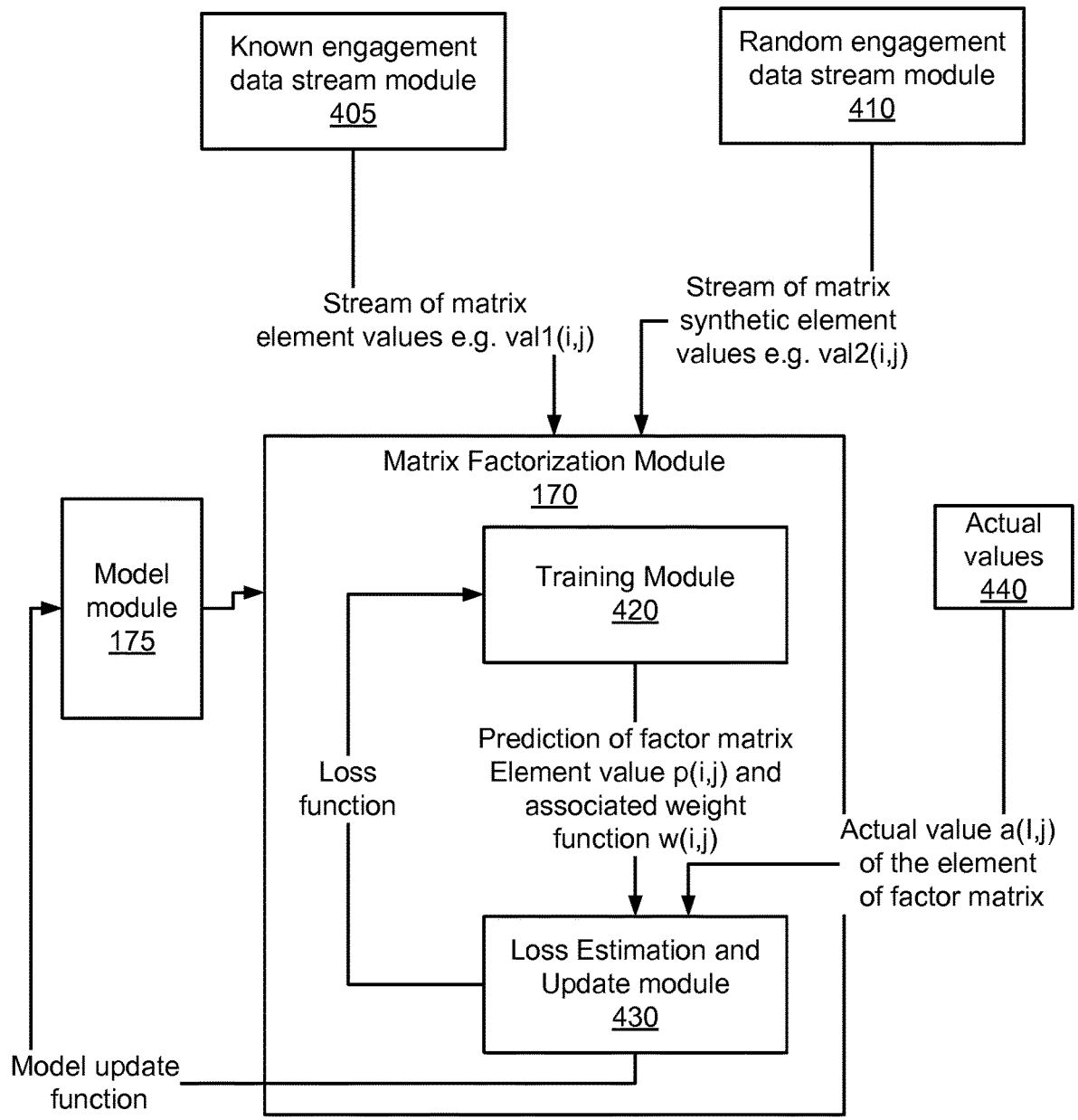
FIG. 4 is a block diagram of logical components of a matrix factorization module for predicting and updating a computer model, according to one embodiment.
Figure 5:
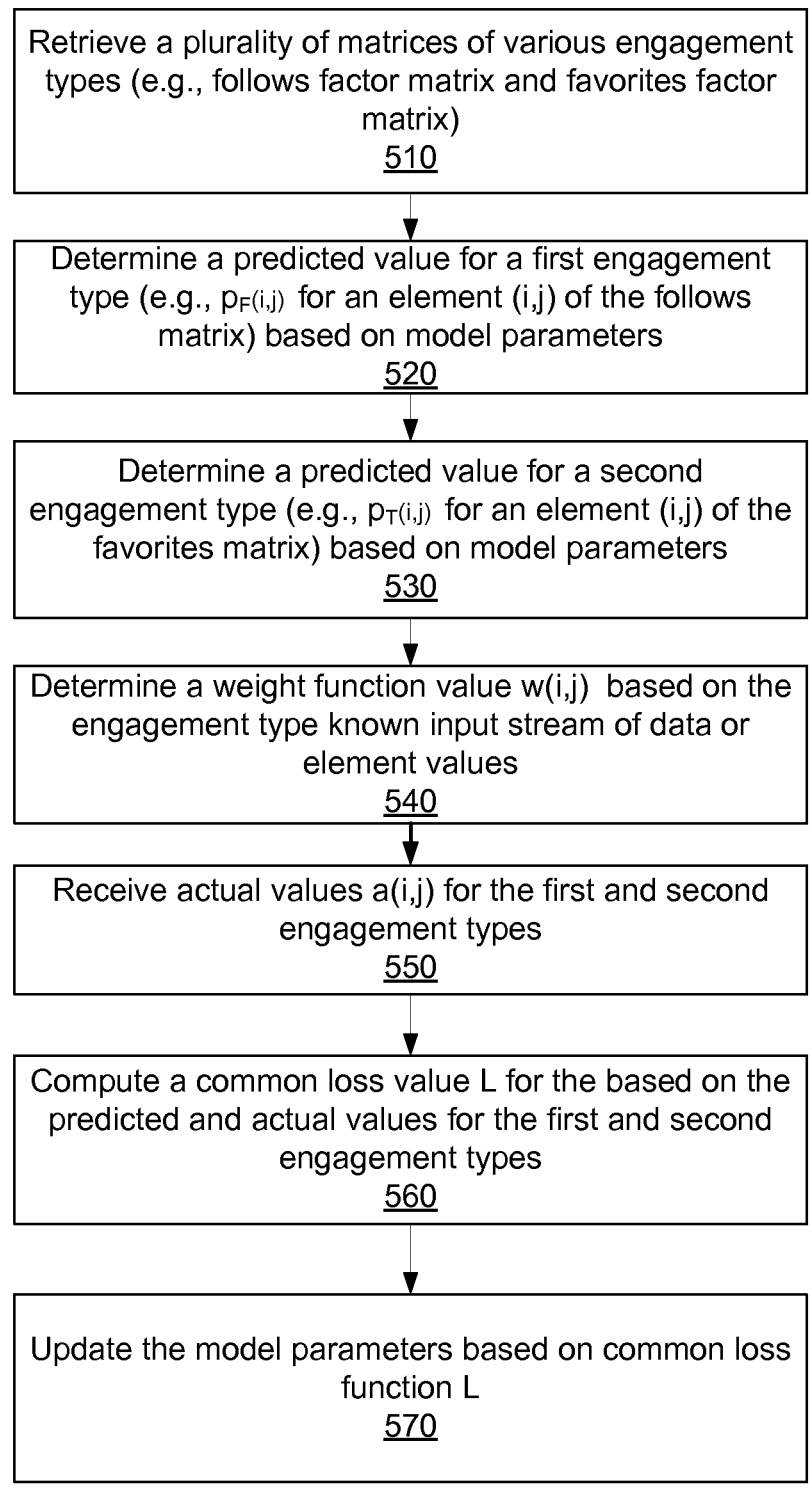
FIG. 5 is a flowchart of a method for predicting and updating a computer model for prediction of engagement types for a user, according to one embodiment.

The engagement recommendation server 190 (or recommendation server) receives and responds to requests to provide content recommendations to account holders. To do this, the recommendation server 190 recommends content based on the prediction of element values of the engagement matrices associated with account holder behavior with respect to the messaging server 130. A matrix factorization module 170 within the engagement recommendation server generates and updates a computer model for prediction of the element values of the engagement matrices. As introduced above, the generating and updating of the computer model is generally a batch process performed by server 190 which occurs asynchronously from requests for content recommendations. FIG. 4 describes the logical components of a matrix factorization module for predicting and updating a computer model. FIG. 5 is a flowchart of a batch process for predicting and updating a computer model for prediction of engagement type values for a user, according to one embodiment. For clarity, the method described in FIG. 5 is described as being performed by the logical components of the matrix factorization module 170 as illustrated in FIG. 4, however in practice both the exact steps and ordering of steps in the method, and modules and connections between modules in the module 170 may vary.

The batch process may begin by the matrix factorization module 170 retrieving 510 from the messaging database 160 engagement data, where each engagement is associated with at least one of a number of different engagement types, and where engagements are associated with messages stored in databases 160 and accessible through messaging server instances 130. The engagement data provides the element values for the matrices, as described above. The engagement data may be accessed for model generation and updating purposes as a stream of element values received at a known engagement data stream module 405 and as a stream of matrix synthetic element values received at a random engagement data stream module 410. Module 405 retrieves a known element value val1(i,j), where a known element value is a value in the engagement matrix having a non-empty value. Module 410 retrieves a random element value, where a random element val2(i,j) is any element from the engagement matrix. Given the size of the engagement matrices generally, the engagement matrices tend to be sparsely populated, and thus this random element is likely, though not necessarily, an empty value such as described above with respect to FIG. 3A.

The matrix factorization module 140 further receives from the model module 175 a computer model that was either built or updated in a past interval of time (e.g., during a previous iteration of the batch process). The model may include a global bias vector $g_E$ where E is a type of engagement to be used to provide a recommendation, a pair of bias vectors $b_E^U(i)$ and $b_E^V(j)$, a pair of bias matrices (also referred to as factor matrices) $U_E$ and $V_E$, and a pair of common factor matrices U and V that are shared between the engagement type E and another engagement type E', where the common factor matrices are used to determine recommendations for both engagement types E and E'.

If the computer model did not include the common factor matrices U and V that are shared between multiple engagement types, then to appropriately characterize engagement data, the model would need a separate set of factor matrices for each type of engagement (and corresponding engagement data). Compared to an implementation where the computer model includes the common factor matrices, this would increase the total size of the computer model (i.e., more features/parameters would need to be trained). This would consequently increase the amount of computer processor time that would need to be used to generate and update the model (i.e., perform each run of the batch process), which would in turn either take more actual real-world time to run and/or would require additional computers or computer processing power to perform the batch process.

In contrast, by generating the computer model using the common factor matrices, the amount of computer processing time required to operate the batch process can be reduced such that it is instead possible to run the batch process with a minimal set of server-class computer. Further, the resulting computer model contains sufficiently few features such that it can be stored entirely in active memory (e.g. using memcached) rather than requiring a magnetic storage device to store the model.

A training module 420 within the matrix factorization module 420 receives 510 the computer model and the input stream of known val1(i,j) and synthetic val2(i,j) element values. Using these inputs, the training module 420 computes a prediction function $p_E(i,j)$ that describes the prediction for an element value (i,j) of an engagement type E and matrix ME. For example, the prediction $p_F(i,j)$ computes the prediction that one user will follow another user (e.g., the follow engagement type F) using the follows matrix $M_F$ 310 and the favorites matrix $M_T$ 320 according to:

$$p_F(i,j)=\text{dot}(U(i),V(j))+g_F+b_F^U(j)+\text{dot}(U_F(i),V_F(j))$$

wherein the variables are as described above, and in this example U and V are the common factor matrices for both follows F and favorites T together and the prediction function uses a dot product of the variables.

Similarly the following prediction function $p_T(i,j)$ computes the prediction that one user will favorite a message posted by another user using the favorites matrix 320 and the follows matrix 310 according to:

$$p_T(i,j)=\text{dot}(U(i),V(j))+g_T+b_T^U?(i)+b_T^V(j)+\text{dot}(U_T(i),V_T(j))$$

wherein the variables are as described above, except that the relevant model parameters are chosen from those associated with favorites T rather than follows F and the prediction function is a dot product of the variables. Similar examples would be applicable for other types of engagements.

Based on the prediction function, a value p (i,j) is predicted 520, 530 for one or more of the unknown element values of each engagement type matrix M of interest. In the example of FIG. 5, a single iteration of the example process results in the training module 420 determining 520, 530 a single a $p_F(i,j)$ and a single $p_T(i,j)$ is determined for an element (i,j) of a follows matrix $M_F$ 310 and an element (i,j) of a favorites matrix $M_T$ 320, respectively.

Additionally, the training module 420 determines 540 a weight function w(i,j) for each of the predicted element values p(i,j). The weight function w(i,j) adjusts the weight of a predicted element value p(i,j) for an account holder, and is based on the known input stream data (e.g., val1(i,j) values) received from module 405. The matrix factorization module 170 generally uses the weight function to upweight or downweight prediction values according to external criteria, such as account holder popularity, message recency (e.g., time since authorship or last engagement), or any number of other factors. As one example, with respect to FIG. 3A, an example user i may occur more often in the received known 405 and/or synthetic 410 element values received in training relative to other users. This may result, for instance, if there are many users following user i, thereby causing user i to show up disproportionately more often as training data than other users. As a result, absent correction user i may be influencing the training of model parameters (e.g., $g_E$, $b_E^U$(i), $b_E^V$(j), $U_E$, $V_E$(j), U(i), and V(j)) in a way that is contrary to the recommendation server's 190 design specification. To counteract this effect, the weighting function w(i,j) may be used to reduce the effect of user i on the training of model. This may be accomplished, for example, by the training module 420 assigning a value of less than 1 or a negative value to (e.g., a lower weighting) to user i in function w(i,j) relative to other users, to counteract the impact of user i on the model training.

The matrix factorization module 170 further receives 550 actual element value a(i,j) for each of the engagement types that is being used to generate a recommendation (e.g., continuing the example above $a_F(i,j)$ for follows F, and $a_T(i,j)$ for favorites T) from an actual values module 440.

The matrix factorization module 170 sends the predicted values p(i,j), weight function w(i,j) and actual values a(i,j) is sent to a loss estimation and update module 430 (or simply update module 430) that computes 560 a common loss function L and updates the model parameters (e.g., $g_E$, $b_E^U$(i), $b_E^V$(j), $U_E$(i), $V_E$(j), U(i), and V(j)). The common loss function L is based on the difference between the actual a(i,j) and predicted values p(i,j) for each such pair that is calculated.

The common loss function L is referred to as "common" because the loss function is determined based on p(i,j) values, which themselves are based on the common factor matrices U and V which are shared between engagement types. This means that an item of training data in the form of pE(i,j)/a(i,j) for engagement type E, will in turn affect model parameters of another engagement type E', in that the pE(i,j)/a(i,j) pair will dictate the common loss function L, which in turn affects the values of U(i) and V(j), which are used in determining future values of pE'(i,j). The reverse is also true, as pE'(i,j) values will affect future pE(i,j) values by adjusting common factor matrices U and V.

Yet another advantage arising out of the use of common factor matrices with specific regard to the common loss function is that even in the event that engagement data for a particular engagement type is only sparsely available, the common factor matrices can still be trained/iterated upon based on data from the other, common, engagement type that shares the same common factor matrices. More broadly, the common factor matrices benefit from training based on both types of engagement data, as being trained on more data improves their accuracy and precision, relative to being trained on only one type of engagement data.

In one embodiment and continuing with the example introduced above where the p(i,j) values are calculated for the follows matrix $M_F$ and favorites matrix $M_T$ (e.g., $p_F(i,j)$, $p_T(i,j)$, $a_F(i,j)$ and $a_T(i,j)$), the common loss function L is computed according to:

$$L(g_F, g_T, b_F^U, b_F^V, b_T^U, b_T^V, U, V, U_F, V_F, U_T, V_T) = \frac{1}{2}\left(\sum_{i,j}^{M_F,M_T} w(i,j)(p(i,j)-a(i,j))^2\right) + \frac{\lambda}{2}L_2(g_F, g_T, b_F^U, b_F^V, b_T^U, b_T^V, U, V, U_F, V_F, U_T, V_T)$$

The update module 430 uses the common loss function L to update 570 the model parameters, which on average will reduce L on future iterations, thus reducing the differences between future a(i,j) and p(i,j) pairs. The update module 430 may use a variety of different techniques to update the model parameters based on the common loss function L. In one embodiment, the updated module 430 updates the elements of the prediction functions according to:

$$g \leftarrow g - \eta(w(i, j)(p(i, j) - a(i, j)) + \lambda g$$

$$b^U(i) \leftarrow b^U(i) - \eta\left(w(i, j)(p(i, j) - a(i, j)) + \frac{\lambda}{n_i} b^U(i)\right)$$

$$b^V(i) \leftarrow b^V(i) - \eta\left(w(i, j)(p(i, j) - a(i, j)) + \frac{\lambda}{n_i} b^V(i)\right)$$

$$U(i) \leftarrow U(i) - \eta\left(w(i, j)(p(i, j) - a(i, j))V(j) + \frac{\lambda}{n_i} U(i)\right)$$

$$V(i) \leftarrow V(i) - \eta\left(w(i, j)(p(i, j) - a(i, j))U(j) + \frac{\lambda}{n_i} V(i)\right)$$

wherein the update is a shift of the original model parameter (e.g., g, b, U, or V) by an amount indicated by the common loss function L value, in this example represented by η(w (i,j)(p(i,j)−a (i,j)), wherein η is an adjustable parameter that controls the learning rate for optimizing the loss function L. The update module 430 may make use of machine learning techniques, such as a Stochastic Gradient Descent, to more efficiently increase the rate at which L is reduced over fewer iterations of training data (e.g., fewer p(i,j)/a(i,j) iterations).

Once the update module 430 updates the model parameters, the updated model parameters are stored in the model module 175 for use in the future. This process may be repeated for each item of engagement data in the streams 405,410 until the batch process is completed.

V. Recommendation of Content of Based on the Model Parameters

Figure 6:
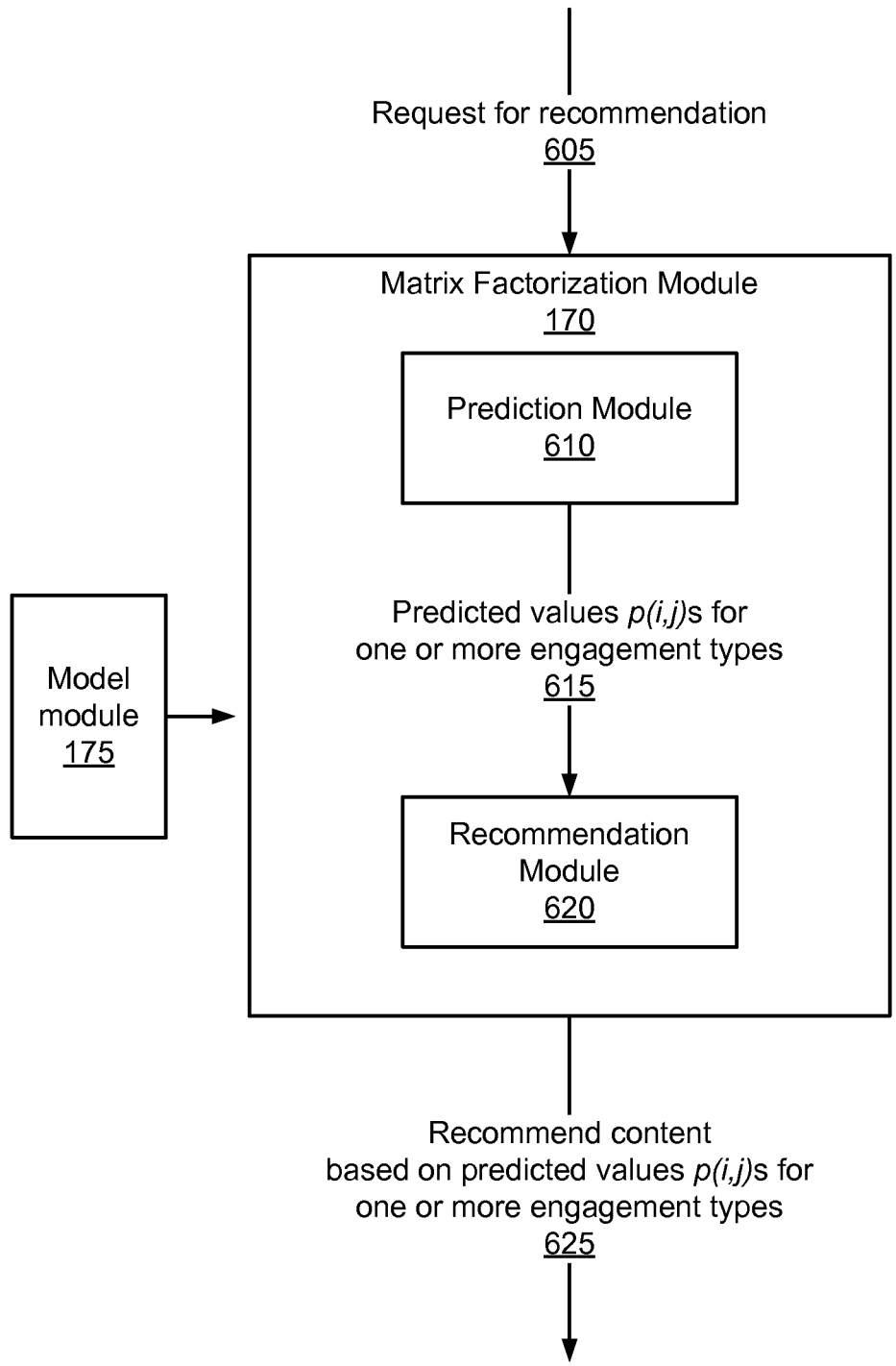
FIG. 6 is a block diagram of logical components for recommending content of a plurality of engagement types for an account, according to one embodiment.

FIG. 6 is a block diagram illustrating how the matrix factorization module 170 can make use of the model parameters to predict the likelihood of various engagement types occurring and recommend content accordingly, according to one embodiment. The matrix recommendation module 170 receives a request 605 from a messaging server instance 130 for a recommendation for content. The request 605 identifies the account holder who is to receive the recommended content. The request 605 also identifies either what type of content is going to be recommended (e.g., what other accounts to follow, what other messages to view, what users to block, what URLs to click), or what types of engagement types are to be used to provide the recommendation. If the request 605 identifies what type of content is going to be recommended, the matrix factorization module 170 can convert this into the engagement types to be used to inform the recommendation.

To determine the recommendation, the matrix factorization module 170 accesses the model parameters from the model module 175. More specifically, module 170 accesses the specific model parameters (e.g., $g_E$, $b_E^U(i)$, $b_E^V(j)$, $U_E(i)$, $V_E(j)$, U(i), and V(i)) associated with the specific engagement types (e.g., E and E') identified in the request. Module 170 determines one or more predicted element values $p_E(i,j)$ one or more of the engagement type matrices.

As discussed above, the model parameters include common factor matrices U(i) and V(j) which are trained on and shared between multiple engagement types, e.g., E and E'. As a consequence, regardless of what type of engagement E is to be used in the recommendation, on the basis of the use of U(i) and V(i) in the model, the recommendation will incorporate some previous knowledge of the likelihood of the other type of engagement (e.g., E') for the account holder specified in the request.

The matrix factorization module 170 includes a prediction module 610 that uses the accessed model parameters to predict the likelihood of the engagement types specified or inferred from the request. The prediction module 610 computes likelihood by computing prediction function $p_E(i,j)$ as introduced above. The calculation may be identical to that introduced above. However, in contrast to the model training circumstance described above, the prediction module 610 computes the prediction function $p_E(i,j)$ for a number 615 of different possible engagements of a single type to identify which of those engagements is most likely. For example, the prediction module 610 may compute the prediction function $p_E(i,j)$ for many if not all of the rows or columns of the engagement matrix $M_E$ associated with engagement type E sought to be recommended. Module 610 may compute these prediction functions for more than engagement type E, as specified by the request 605.

The matrix factorization module 170 includes a recommendation module 620 that receives the predicted likelihoods of engagement p(i,j)s from the prediction module 610 and uses them to identify content to recommend. In one embodiment, the predicted values p(i,j)s are ranked from highest to lowest, where higher values indicate a greater likelihood of occurrence. The recommendation module 620 selects the top N engagements and provides them to the messaging server 130 in response to the request 605. These engagement represent either the recommended content itself (e.g., recommendation of another account to follow), or may be used to identify content to recommend (e.g., a URL the account holder is likely to click on may identify a web page to recommend).

An underlying assumption of this kind of recommendation is that if the model parameters indicate that a particular engagement is likely, it is because the account holder has model parameters in common with other account holders who have already triggered the engagement, and that consequently the model assumes that the account holder in question is receptive to the engagement as well. Thus, by recommending the engagement itself or by recommending content associated with the engagement, the assumption is that the receiving account holder will be receptive to performing the engagement.

In an alternate embodiment, rather than the matrix factorization module 170 including the recommendation module 620, the recommendation module 620 is a part of the messaging server 130 instances, which receives the predicted values p(i,j)s directly and incorporates them into an existing recommendation process that may take into account other factors for determining what content to recommend.

FIG. 7 is a flowchart of an example method for recommending accounts to follow and messages to favorite, according to one embodiment. The matrix factorization module 170 receives 710 a request for a recommendation for content for an account holder i regarding other accounts to follow and messages they might be interested in. Module 170 associates the request 605 with the follows matrix $M_F$ and the favorites matrix $M_T$, and accesses 720 the model parameters associated with those engagement matrices. In this example, this is $g_F$, $b_F^U(i)$, $b_F^V(j)$, $U_F(i)$, $V_F(j)$, U(i), and V(i) as well as $g_T$, $b_T^U(i)$, $b_T^V(j)$, $U_T(i)$, $V_T(j)$. In this example embodiment, the model parameters for these engagement matrices has been trained, for example according to example implementation described above with respect to FIGS. 4 and 5, such that the common factor matrices U and V are trained on both follow engagement matrix data $M_F$ and favorite engagement matrix data $M_T$. This is not required in all implementations. In practice, a request may include a request for recommendation for multiple types of content where the common factor matrices associated with the requested engagement types were trained on other engagement type data that was not requested. However, this will occur in some instances. In practice, what this means is that the recommendation for content associated with one engagement type may be determined based on engagement data of another engagement type, based on the fact that the two engagement types were trained on a shared set of common factor matrices U and V.

The prediction module 610 uses the model parameters to predict the likelihood that account holder i will follow a variety of other accounts j by determining $p_F(i,j)$ 730, and also predicts the likelihood that the account holder i will favorite a variety of messages j by determining $p_T(i,j)$ 730. The recommendation module 620 receives these predicted values, ranks 740 the predicted values, and selects 750 the top N $p_F(i,j)$ and $p_T(i,j)$ values. As each of these values corresponds to another account j that account holder i can follow and a message j that account holder i may favorite, respectively, in this example the top N predicted values also represent the top N of items of content in the social messaging system that may be recommended to the user. Thus, in this embodiment the matrix factorization module 170 may return 760 these top N items of content to the messaging server instance 130 as a recommendation of content to provide to the account holder i.

VI. Additional Considerations

Example benefits and advantages of the disclosed configurations include recommending content to an account holder that has a high probability of relevance to the account holder based on their previous engagement data. Additionally, multiple types of user engagements and recommendations are determined in real-time for high volumes of account holders and messages in an efficient and accurate manner.

In one embodiment, a computer-executed method, stored as instructions in a non-transitory computer readable storage medium, and in some instances associated with an engagement recommendation server receives a content recommendation request for an account holder of a messaging system. The messaging system stores historical engagement data of engagements by account holders with associated content made accessible by the messaging system. Each engagement comprises an engagement type. The method further comprises accessing a set of common factor matrices wherein the common factor matrices are determined based on historical engagement data of a first engagement type and of a second engagement type that is different from the first engagement type. A set of historical engagements of the first engagement type triggered by account holders of the messaging system other than the requested account holder is accessed. Based on the accessed historical engagements and the common matrices, a numerical likelihood of engagement indicating a likelihood that the account holder will perform a new engagement of the first engagement type with content associated with the historical engagement is determined. A subset of historical engagements based on the numerical likelihoods of the engagements are selected and content associated with that subset of historical engagements is sent as a response to the content request for the account holder of the messaging system.

In this or a different embodiment, the method additionally comprises determining the common factor matrices based on differences between actual engagement data and historical engagement data of both the first and second engagement types.

In the previous or a different embodiment, the method of accessing the set of common factor matrices further comprises calculating a plurality of numerical likelihoods of engagement based on a plurality of historical engagements by account holders and a plurality of synthetic engagements, both drawn from the engagement data stored by the messaging system. The numerical likelihoods of engagement are compared with the corresponding actual engagement data for those account holders based on engagements received by the messaging system. A common loss function is determined based on a plurality of differences between the actual likelihoods of engagement and the predicted likelihoods of engagement. The common factor matrices are updated based on the differences.

In any of the previous embodiments or in a different embodiment, the subset of historical engagements that have the highest numerical likelihoods of engagement are selected.

In any of the previous embodiments or in a different embodiment, the method of choosing a different engagement type for a first and second engagement type comprises choosing from a group comprising other accounts of the messaging system that the account holder may follow, messages of the messaging system the account holder may engage with to favorite, messages of the messaging system the account holder may engage with to repost, other accounts of the messaging system that the account holder may block or uniform resource locators (URLs) included in messages of the messaging system that the account holder may click.

In any of the previous embodiments or in a different embodiment, the method additionally comprises identifying the second engagement type as another type of content to recommend in response to the request. A second set of historical engagements of the second engagement type triggered by the account holders of the messaging system other than the account holder are accessed. A numerical likelihood of engagement indicating a likelihood that the account holder will perform an engagement of the second engagement type with content associated with the historical engagement is determined for the historical engagements of the second set. A second subset of historical engagements based on the numerical likelihoods of engagement from the second set is selected. In response to the content recommendation request, content associated with the second subset of the historical engagements is provided.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

It will be understood that the named components represent one embodiment, and other embodiments may include other components. In addition, other embodiments may lack the components described herein and/or distribute the described functionality among the components in a different manner. Additionally, the functionalities attributed to more than one component can be incorporated into a single component.

As noted above, the computing devices described in the figures include a number of "modules," which refers to computational logic for providing the specified functionality. A module is implemented in software that operates on at least one computing device. Each module can be implemented as a standalone software program, but can also be implemented through other means, for example as part of a larger program, as a plurality of separate programs, or as one or more statically or dynamically linked libraries. In any of these software implementations, the modules are stored either in active memory or in computer readable persistent storage devices of the computing device(s) within which they are located, loaded into memory, and executed by one or more processors (generally, "a processor") of the computing device. The various data processing operations described herein are sufficiently complex and time consuming as to require the operation of a computing device, and cannot be performed merely by mental steps.

Embodiments described may also relate to an apparatus for performing the operations herein. This apparatus may be constructed for the purpose described herein, owing to the large number of accounts, messages, streams, and related content (e.g., engagements) that are processed by the messaging system generally, and which are processed by the engagement recommendation server 190 specifically. The data generated by the engagement recommendation server 190 are stored either in active memory or are persistently stored in a non-transitory, tangible computer readable storage medium as described above. Furthermore, any of the computing devices referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments described is intended to be illustrative, but not limiting, of the scope of what is protectable, which is set forth in the following claims.

What is claimed is:

1. A method performed by one or more computers, the method comprising:
receiving a content recommendation request for a first account holder of a messaging system, the messaging system storing historical engagement data of engagements by account holders with content made accessible by the messaging system, each engagement being an engagement of a respective engagement type recorded by the messaging system;
accessing a set of pairs of factor matrices, including:
an engagement-specific pair of factor matrices $U_E$ and $V_E$ each comprising engagement-specific parameter values computed from training examples of only a first engagement type, wherein the engagement-specific matrices each define a respective engagement-specific vector of values for each of a plurality of account holders, wherein an engagement-specific dot product $dot(U_E(j), V_E(i))$ for account holders i and j is the dot product of the vector $U_E(i)$ for account holder i and the vector $V_E(j)$ for the account holder j, and
a general pair of factor matrices U and V each comprising general parameter values computed from training examples of a plurality of engagement types comprising the first engagement type and one or more other engagement types, wherein the general matrices each define a respective general vector of values for each of a plurality of account holders, wherein a general dot product $dot(U(i), V(j))$ for account holders i and j is the dot product of the vector $U(i)$ for account holder i and the vector $V(j)$ for the account holder j;
accessing data representing a plurality of historical engagements of the first engagement type performed by account holders of the messaging system other than the first account holder;
determining, for each of the accessed historical engagements, a respective predicted likelihood that the first account holder will perform a new engagement of the first engagement type with content associated with the accessed historical engagement, each accessed historical engagement being associated with a respective second account holder, including:
computing a general engagement score, for each of a plurality of second account holders, from the general dot product for the first account holder and the respective second account holder,
computing an engagement-specific score for the first engagement type, for each of the plurality of second account holders, from the engagement-specific dot product for the first account holder and the respective second account holder, and
computing, for each of the plurality of second account holders, the predicted likelihood of engagement for the first engagement type from a sum of the general engagement score for the plurality of engagement types and the engagement-specific score for the first engagement type;
selecting one or more content items associated with respective historical engagements of the plurality of historical engagements based on the respective computed predicted likelihood of engagement for the first engagement type; and
responding to the content recommendation request with the selected one or more content items.

2. The method of claim 1, further comprising training the general pair of factor matrices using actual engagement data stored in a first engagement-specific matrix for the first engagement type and a second engagement-specific matrix for a second engagement type of the plurality of engagement types, including:
calculating a plurality of numerical likelihoods of engagement based on a current iteration of the general pair of factor matrices using a plurality of historical engagements by a plurality of account holders,
computing a value of a common loss function including comparing the predicted likelihood of engagement computed from the general pair of factor matrices with actual engagement data for the plurality of account holders stored in multiple respective engagement-specific matrices for both the first engagement type and the second engagement type, and
updating the general pair of factor matrices based on the computed value of the common loss function.

3. The method of claim 1, wherein selecting the one or more content items comprises selecting a content item associated with a historical engagement having the highest numerical likelihood of engagement.

4. The method of claim 1, wherein a type of engagement for the first engagement type or a second engagement type represents:
one account of the messaging system subscribing to receive a message stream from another account of the messaging system;
one account of the messaging system favoriting a message submitted by another account of the messaging system;

one account of the messaging system reposting a message by another account of the messaging system;
one account of the messaging system blocking another account of the messaging system; or
one account selecting a uniform resource locators (URLs) included in a message by another account of the messaging system.

5. The method of claim 1, further comprising:
accessing data representing a second plurality of historical engagements of a second engagement type of the plurality of engagement types, the second plurality of historical engagements being performed by a second plurality of account holders of the messaging system other than the first account holder;
determining, for each of the second plurality of historical engagements, a respective second predicted likelihood that the first account holder will perform a new engagement of the second engagement type with content associated with the accessed historical engagement, including:
computing a second engagement-specific score that relates the engagement-specific parameter values of the first account holder in the engagement-specific pair of factor matrices to engagement-specific parameter values of the second account holder in the engagement-specific pair of factor matrices, and
computing the second predicted likelihood of engagement based on a sum of the general engagement score and the second engagement-specific score;
selecting one or more second content items associated with respective historical engagements of the second plurality of historical engagements of the second engagement type based on the computed second predicted likelihood that the first account holder will perform a new engagement of the second engagement type; and
responding to the content recommendation request with the selected one or more second content items.

6. The method of claim 1, wherein computing the predicted likelihood of engagement comprises computing a sum of the general engagement score, the engagement-specific score, a first engagement-specific bias value for the first account holder, and a second engagement-specific bias value for the second account holder.

7. The method of claim 2, further comprising:
training three pairs of matrices to make engagement predictions, comprising:
training the general pair of factor matrices to make predictions on a number of features,
training the engagement-specific pair of factor matrices for the first engagement type, and
training a second engagement-specific pair of factor matrices for the second engagement type,
such that a total number of parameters for the three matrices is less than a number of learned parameters required to separately train the number of features for the first engagement-specific matrix and the second engagement-specific matrix.

8. The method of claim 7, wherein training the general pair of factor matrices is performed without constructing from the training data a single matrix representing the plurality of engagement types.

9. One or more non-transitory computer-readable storage media encoded with instructions that when executed by one or more computers cause the one or more computers to perform operations comprising:
receiving a content recommendation request for a first account holder of a messaging system, the messaging system storing historical engagement data of engagements by account holders with content made accessible by the messaging system, each engagement being an engagement of a respective engagement type recorded by the messaging system;
accessing a set of pairs of factor matrices, including:
an engagement-specific pair of factor matrices $U_E$ and $V_E$ each comprising engagement-specific parameter values computed from training examples of only a first engagement type, wherein the engagement-specific matrices each define a respective engagement-specific vector of values for each of a plurality of account holders, wherein an engagement-specific dot product $dot(U_E(j),V_E(i))$ for account holders i and j is the dot product of the vector $U_E(i)$ for account holder i and the vector $V_E(i)$ for the account holder j, and
a general pair of factor matrices U and V each comprising general parameter values computed from training examples of a plurality of engagement types comprising the first engagement type and one or more other engagement types, wherein the general matrices each define a respective general vector of values for each of a plurality of account holders, wherein a general dot product $dot(U(i),V(j))$ for account holders i and j is the dot product of the vector U(i) for account holder i and the vector V(j) for the account holder j;
accessing data representing a plurality of historical engagements of the first engagement type performed by account holders of the messaging system other than the first account holder;
determining, for each of the accessed historical engagements, a respective predicted likelihood that the first account holder will perform a new engagement of the first engagement type with content associated with the accessed historical engagement, each accessed historical engagement being associated with a respective second account holder, including:
computing a general engagement score, for each of a plurality of second account holders, from the general dot product for the first account holder and the respective second account holder,
computing an engagement-specific score for the first engagement type, for each of the plurality of second account holders, from the engagement-specific dot product for the first account holder and the respective second account holder, and
computing, for each of the plurality of second account holders, the predicted likelihood of engagement for the first engagement type from a sum of the general engagement score for the plurality of engagement types and the engagement-specific score for the first engagement type;
selecting one or more content items associated with respective historical engagements of the plurality of historical engagements based on the respective computed predicted likelihood of engagement for the first engagement type; and
responding to the content recommendation request with the selected one or more content items.

10. The one or more computer-readable storage media of claim 9, wherein the operations further comprise training the general pair of factor matrices using actual engagement data stored in a first engagement-specific matrix for the first engagement type and a second engagement-specific matrix for a second engagement type of the plurality of engagement types, including:

calculating a plurality of numerical likelihoods of engagement based on a current iteration of the general pair of factor matrices using a plurality of historical engagements by a plurality of account holders, computing a value of a common loss function including comparing the predicted likelihood of engagement computed from the general pair of factor matrices with actual engagement data for the plurality of account holders stored in multiple respective engagement-specific matrices for both the first engagement type and the second engagement type, and updating the general pair of factor matrices based on the computed value of the common loss function.

11. The one or more computer-readable storage media of claim 9, wherein selecting the one or more content items comprises selecting a content item associated with a historical engagement having the highest numerical likelihood of engagement.

12. The one or more computer-readable storage media of claim 9, wherein a type of engagement for the first engagement type or a second engagement type represents:

one account of the messaging system subscribing to receive a message stream from another account of the messaging system;

one account of the messaging system favoriting a message submitted by another account of the messaging system;

one account of the messaging system reposting a message by another account of the messaging system;

one account of the messaging system blocking another account of the messaging system; or one account selecting a uniform resource locators (URLs) included in a message by another account of the messaging system.

13. The one or more computer-readable storage media of claim 9, wherein the operations further comprise:

accessing data representing a second plurality of historical engagements of a second engagement type of the plurality of engagement types, the second plurality of historical engagements being performed by a second plurality of account holders of the messaging system other than the first account holder;

determining, for each of the second plurality of historical engagements, a respective second predicted likelihood that the first account holder will perform a new engagement of the second engagement type with content associated with the accessed historical engagement, including:

computing a second engagement-specific score that relates the engagement-specific parameter values of the first account holder in the engagement-specific pair of factor matrices to engagement-specific parameter values of the second account holder in the engagement-specific pair of common factor matrices, and computing the second predicted likelihood of engagement based on a sum of the general engagement score and the second engagement-specific score;

selecting one or more second content items associated with respective historical engagements of the second plurality of historical engagements of the second engagement type based on the computed second predicted likelihood that the first account holder will perform a new engagement of the second engagement type; and responding to the content recommendation request with the selected one or more second content items.

14. A computer system comprising:

one or more computers and one or more storage devices storing instructions that are operable, when executed by the one or more computers, to cause the one or more computers to perform operations comprising:

receiving a content recommendation request for a first account holder of a messaging system, the messaging system storing historical engagement data of engagements by account holders with content made accessible by the messaging system, each engagement being an engagement of a respective engagement type recorded by the messaging system;

accessing a set of pairs of factor matrices, including:

an engagement-specific pair of common factor matrices $U_E$ and $V_E$ each comprising engagement-specific parameter values computed from training examples of only a first engagement type, wherein the engagement-specific matrices each define a respective engagement-specific vector of values for each of a plurality of account holders, wherein an engagement-specific dot product $dot(U_E(j),V_E(i))$ for account holders i and j is the dot product of the vector $U_E(i)$ for account holder i and the vector $V_E(j)$ for the account holder j, and a general pair of factor matrices U and V each comprising general parameter values computed from training examples of a plurality of engagement types comprising the first engagement type and one or more other engagement types, wherein the general matrices each define a respective general vector of values for each of a plurality of account holders, wherein a general dot product $dot(U(i),V(j))$ for account holders i and j is the dot product of the vector U(i) for account holder i and the vector V(j) for the account holder j;

accessing data representing a plurality of historical engagements of the first engagement type performed by account holders of the messaging system other than the first account holder;

determining, for each of the accessed historical engagements, a respective predicted likelihood that the first account holder will perform a new engagement of the first engagement type with content associated with the accessed historical engagement, each accessed historical engagement being associated with a respective second account holder, including:

computing a general engagement score, for each of a plurality of second account holders, from the general dot product for the first account holder and the respective second account holder, computing an engagement-specific score for the first engagement type, for each of the plurality of second account holders, from the engagement-specific dot product for the first account holder and the respective second account holder, and computing, for each of the plurality of second account holders, the predicted likelihood of engagement for the first engagement type from a sum of the general engagement score for the plurality of engagement types and the engagement-specific score for the first engagement type;

selecting one or more content items associated with respective historical engagements of the plurality of historical engagements based on the respective computed predicted likelihood of engagement for the first engagement type; and responding to the content recommendation request with the selected one or more content items.

15. The computer system of claim 14, wherein the operations further comprise training the general pair of factor matrices using actual engagement data stored in a first engagement-specific matrix for the first engagement type and a second engagement-specific matrix for a second engagement type of the plurality of engagement types, including:

calculating a plurality of numerical likelihoods of engagement based on a current iteration of the general pair of factor matrices using a plurality of historical engagements by a plurality of account holders, computing a value of a common loss function including comparing the predicted likelihood of engagement computed from the general pair of factor matrices with actual engagement data for the plurality of account holders stored in multiple respective engagement-specific matrices for both the first engagement type and the second engagement type, and updating the general pair of factor matrices based on the computed value of the common loss function.

16. The computer system of claim 14, wherein selecting the one or more content items comprises selecting a content item associated with a historical engagement having the highest numerical likelihood of engagement.

17. The computer system of claim 14, wherein a type of engagement for the first engagement type or a second engagement type represents:

one account of the messaging system subscribing to receive a message stream from another account of the messaging system;

one account of the messaging system favoriting a message submitted by another account of the messaging system;

one account of the messaging system reposting a message by another account of the messaging system;

one account of the messaging system blocking another account of the messaging system; or one account selecting a uniform resource locators (URLs) included in a message by another account of the messaging system.

18. The computer system of claim 14, wherein the operations further comprise:

accessing data representing a second plurality of historical engagements of a second engagement type of the plurality of engagement types, the second plurality of historical engagements being performed by a second plurality of account holders of the messaging system other than the first account holder;

determining, for each of the second plurality of historical engagements, a respective second predicted likelihood that the first account holder will perform a new engagement of the second engagement type with content associated with the accessed historical engagement, including:

computing a second engagement-specific score that relates the engagement-specific parameter values of the first account holder in the engagement-specific pair of factor matrices to engagement-specific parameter values of the second account holder in the engagement-specific pair of common factor matrices, and computing the second predicted likelihood of engagement based on a sum of the general engagement score and the second engagement-specific score;

selecting one or more second content items associated with respective historical engagements of the second plurality of historical engagements of the second engagement type based on the computed second predicted likelihood that the first account holder will perform a new engagement of the second engagement type; and responding to the content recommendation request with the selected one or more second content items.

* * * * *